United States Patent

Gerster et al.

[11] Patent Number: 5,917,297
[45] Date of Patent: Jun. 29, 1999

[54] ARRANGEMENT AND METHOD FOR OPERATING A MAGNETICALLY SUSPENDED, ELECTROMOTORIC DRIVE APPARATUS IN THE EVENT OF A MAINS DISTURBANCE

[75] Inventors: Christian Gerster, Zürich; Reto Schöb, Volketswil; Thomas Gempp, Reinach, all of Switzerland

[73] Assignees: Lust Antriebstechnik GmbH, Lahnau, Germany; Sulzer Electronics AG, Winterthur, Switzerland

[21] Appl. No.: 08/890,260

[22] Filed: Jul. 9, 1997

[30] Foreign Application Priority Data

Jul. 25, 1996 [EP] European Pat. Off. ............. 96810493

[51] Int. Cl.⁶ .............................. F16C 32/04; H02J 9/00; H02H 3/24
[52] U.S. Cl. .......................... 318/366; 318/376; 318/459
[58] Field of Search ..................................... 318/375, 376, 318/365, 366, 367, 459; 310/90, 90.5

[56] References Cited

U.S. PATENT DOCUMENTS 4,121,143 10/1978 Habermann et al. .................... 318/629
4,626,754 12/1986 Habermann et al. .................... 318/460

FOREIGN PATENT DOCUMENTS 0 430 009 A1 6/1991 European Pat. Off. .
2 336 819 7/1977 France .
43 06 307 A1 9/1994 Germany .
195 06 849 A1 8/1995 Germany .

OTHER PUBLICATIONS

Patent Abstracts of Japan, vol. 95, No. 011 & JP–A–07 293563 (Ebara Corp.) Nov. 7, 1995, Abstract.
Patent Abstracts of Japan, vol. 95, No. 005 & JP–A–07 127594 (Shimadzu Corp.), May 16, 1995, Abstract.
Patent Abstracts of Japan, vol. 013, No. 295 (E–783), Jul. 7, 1989 & JP–A–01 074081 (Hitachi Ltd.), Mar. 20, 1989, Abstract.

Primary Examiner—Bentsu Ro
Attorney, Agent, or Firm—Townsend and Townsend and Crew LLP

[57] ABSTRACT

The arrangement or apparatus for operating a magnetically suspended, electromotoric drive apparatus in the event of a mains disturbance comprises a drive converter feeding the drive apparatus, a driver feeding a magnetic bearing and a voltage converter, which are connected to a common intermediate circuit. The voltage converter feeds a stopping control apparatus and the drive converter can be switched to a regeneratively acting mode of operation by the stopping control apparatus in the event of a mains disturbance in order to provide at least the driver feeding the magnetic bearing and the stopping control apparatus with electrical energy via the intermediate circuit.

13 Claims, 3 Drawing Sheets

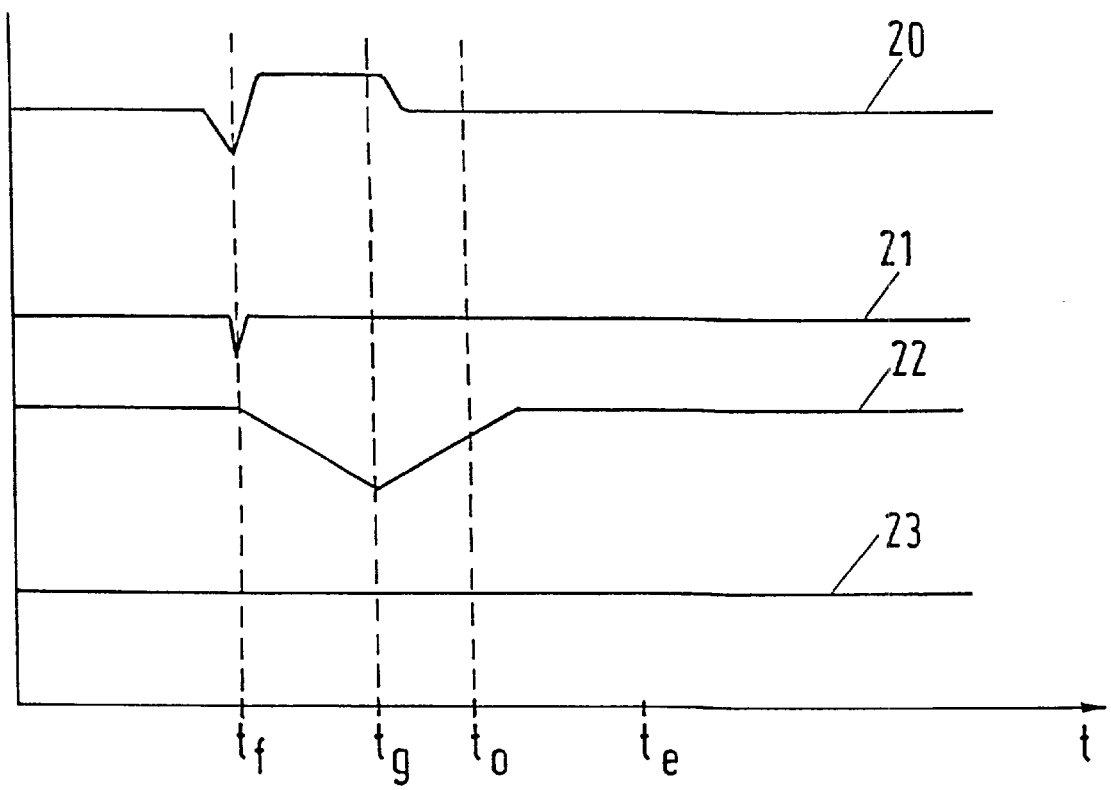

ARRANGEMENT AND METHOD FOR OPERATING A MAGNETICALLY SUSPENDED, ELECTROMOTORIC DRIVE APPARATUS IN THE EVENT OF A MAINS DISTURBANCE

BACKGROUND OF THE INVENTION

The invention relates to an arrangement for operating a magnetically suspended, electromotoric drive apparatus and to a method for operating a magnetically suspended, electromotoric drive apparatus.

The contact-free suspension of rotating apparatuses such as electric motors with active, electrically controlled magnetic bearings is known. Apparatuses of this kind require elaborate safety apparatuses against power interruptions in order to prevent an uncontrollable and abrupt decay of the magnetic bearing force in the case of a power failure. An arrangement is known from EP 0 430 009 which safely brings a magnetically suspended or journalled rotor to a standstill in the event of a power interruption. This arrangement uses batteries as an auxiliary energy source which are activated when the power is interrupted in order to supply the electromagnetic bearings and the control electronics with electrical energy until the rotor reaches a safe standstill. An auxiliary energy source of this kind has the disadvantage that it is relatively expensive, in particular when the rotor is of relatively heavy design. A further disadvantage is to be seen in the fact that the auxiliary energy source requires a continuous maintenance.

SUMMARY OF THE INVENTION

The object of the present invention is to provide an arrangement and a method for operating a magnetically suspended, electromotoric drive apparatus in the event of a mains disturbance which is executed in an economically more advantageous manner.

The arrangement in accordance with the invention for operating a magnetically suspended, electromotoric drive apparatus in the event of a mains disturbance has a drive converter which feeds the drive apparatus, a driver which feeds a magnetic bearing and a voltage converter, which are connected to a common intermediate circuit, with the voltage converter feeding a stopping control apparatus and with the drive converter being switchable in the event of a mains disturbance into a regeneratively acting mode of operation by the stopping control apparatus in order to supply at least the driver and the stopping control apparatus with electrical energy via the intermediate circuit. Thus, in the event of a power failure or an insufficient mains voltage, the kinetic energy stored in the rotating part is partly converted into electrical energy with the help of the electromotoric drive apparatus and the drive converter in order, on the one hand, to brake the rotating part rapidly and, on the other hand, to continue operating at least the magnetic bearings and a stopping control apparatus with the generated electrical energy until the drive apparatus has stopped safely and has been taken out of operation. In the case of a very briefly occurring power supply fault, or of a brief insufficiency in the mains voltage, the drive converter is switched by the stopping control apparatus into a regeneratively acting operation mode in order to make sufficient electrical energy available at least for the operation of the magnetic bearings. As long as the power supply fault is so brief that the rotating part of the drive apparatus is still magnetically suspended when the mains returns to its normal state, the stopping control apparatus will switch the drive converter over to a drivingly acting operational mode in order to bring the motor back to a nominal speed of rotation. In this manner power supply faults lasting only very briefly can be bridged without braking the drive apparatus to a full stop and lowering the rotating shaft into a rest position.

An advantage of the invention is to be seen in the fact that the magnetic bearings and the control electronics of the electromotoric drive apparatus continue to be supplied with electrical energy in the event of a power interruption without the necessity of expensive storage batteries or other external energy storage means.

The drive converter feeding the drive apparatus is executed and is regulated in such a manner that the drive apparatus can be regeneratively braked by extracting rotational energy from the rotating part of the motor, with the electrical energy regeneratively produced therefrom being made available to the magnetic bearings via the common intermediary circuit. Thus electrical energy is available to the magnetic bearings, at least as long as the rotating part rotates, in order to produce a supporting magnetic force.

The drive converter and the electromotoric drive apparatus are preferably controlled with a drive control apparatus which is executed as a vector control apparatus and controls the operation in accordance with a vector control method or a field oriented control, which allows a braking of the rotating part to a speed of rotation of zero or at least nearly zero, with energy being continually taken from the rotating part. With the vector or field oriented control it is possible to regulate the voltage in the intermediate circuit to an equal or even greater value in comparison with the normal operating state, even in the event of a mains or power supply fault or mains interruption, and to maintain this voltage in the intermediate circuit at least until either the speed of rotation of the rotating part has been reduced to zero or nearly zero, or until the mains voltage again becomes available.

The vector control method or the field oriented control is a method which is known in itself, for example from the book "Vector Control of AC Machines, Peter Vas, Clavendon Press, Oxford, 1990". The method of field oriented control is also treated for example in the book "Digitale Regelung elektrischer Antriebe", Rolf Schönfield, Dr. Alfred Hüthig Verlag, Heidelberg, 1988.

The terms vector control and field oriented control are generally used with the same meaning. Therefore in the following the term "vector control" is to be understood as a synonym for the term "field oriented control".

The drive converter, the driver feeding the magnetic bearings and the voltage converter for the stopping control apparatus, which are connected to one another via the intermediate circuit, are each executed as clocked drivers and each have an energy store, usually in the form of a condenser. The energy stored therein is advantageously utilized in order to carry out further control steps after the rotor has come to a standstill.

In a particularly advantageous embodiment of the invention the energy still available in the intermediate circuit after the drive apparatus has come to a standstill is dimensioned in such a manner that enough energy is still available to a stopping control apparatus for the lowering of the rotor into a definite rest position.

In an advantageous embodiment of the invention, the drive converter is operated during the regeneratively acting working mode in such a manner that the voltage fed back to the intermediate circuit corresponds to or even exceeds the voltage previously applied to the intermediate circuit.

During the reverse operation of the drive converter a higher intermediate circuit voltage is thus produced from the lower motor voltage of the drive apparatus. This higher intermediate circuit voltage can be produced, thanks to the vector control used, over a large range of rotational speeds of the drive apparatus, up to a near standstill of the rotor. An advantage of this arrangement is to be seen in the fact that the energy stores such as condensers connected to the intermediate circuit have stored an approximately maximum possible energy when the rotor is at a standstill. This energy is available after the standstill for the controlled taking out of operation or switching off of the magnetic bearings.

Advantageously, electrical energy is available to the stopping control apparatus and to the drivers of the magnetic bearings for several seconds after the rotor has come to a standstill in order to enable a controlled lowering of the rotor and a controlled switching off of the arrangement.

The drive apparatus is preferably executed as an electrical machine, such as a synchronous machine, an asynchronous machine (induction machine), a brushless DC machine or a reluctance machine. The arrest apparatus can also be executed as a part of the drive converter.

BRIEF DESCRIPTION OF THE DRAWINGS

FIG. 3 illustrates the temporal behavior of relevant parameters during a very brief mains fault.

DESCRIPTION OF THE PREFERRED EMBODIMENTS

Figure 1:
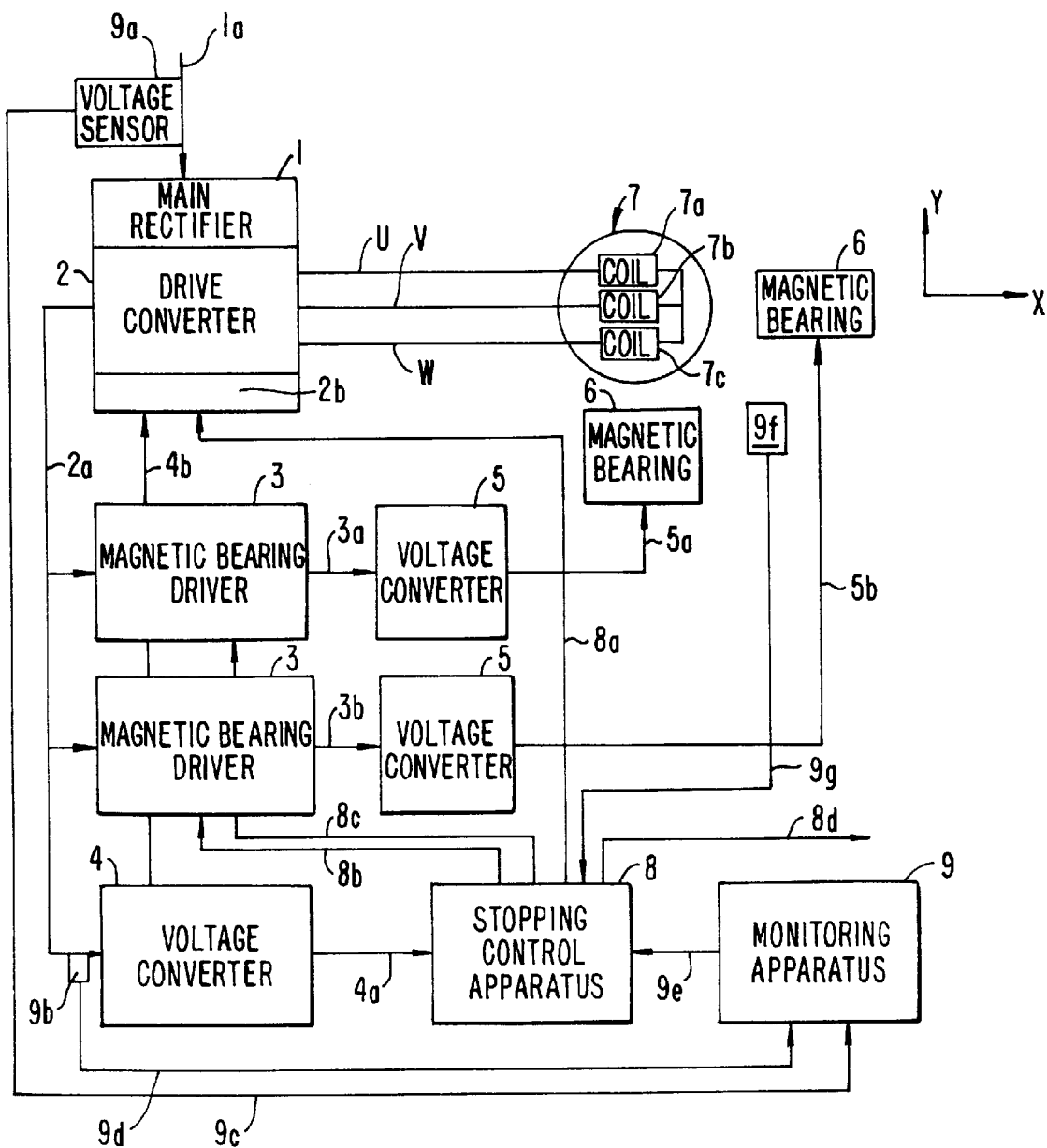
FIG. 1 is a schematic illustration of the arrangement of the apparatus in accordance with the invention.

FIG. 1 schematically shows an exemplary embodiment of the arrangement in accordance with the invention. A mains rectifier 1 is fed from a power mains 1a designed as a one or three phase supply. The voltage present in the mains is monitored by a voltage sensor 9a and supplied via a signal line 9c to a monitoring apparatus 9 which monitors the occurrence of a mains interruption. A drive converter 2 draws the electrical energy from the mains rectifier 1 and is controlled by a drive control device 2b in such a manner that the electromotoric drive apparatus 7, executed in the present example as a three phase asynchronous machine 7 with three coils 7a, 7b, 7c, is supplied with electrical current at the appropriate phase via the three electrical leads U, V, W. The drive converter 2 also feeds two magnetic bearing drivers or setters 3 and a voltage converter 4 via a common direct current intermediate circuit 2a. The magnetic bearing driver 3, also designated as a magnetic bearing amplifier, feeds a magnetic bearing 6 via an electric line 3a, 3b, 5a, 5b. Two magnetic bearings 6 are shown in the exemplary embodiment illustrated, one acting in the vertical direction Y and one acting in the horizontal direction X in order to suspend the rotating shaft of the asynchronous machine 7 free of contact at a bearing location. Not illustrated are sensor elements for measuring the position of the rotating shaft, the values of which are fed to the magnetic bearing driver 3 in order to form a feedback control circuit and to hold the shaft in a predeterminable position in a controlled manner. The electromotoric drive apparatus 7 can be connected to further rotating parts, for example to a pump. The entire rotating arrangement can be suspended free of contact by a plurality of magnetic bearings 6, which magnetic bearings 6 are all controlled by an arrangement in accordance with FIG. 1, in that the plurality of magnetic bearings 6 are connected via magnetic bearing drivers 3 to the intermediate circuit 2a. In the exemplary embodiment in accordance with FIG. 1 only a single contact-free bearing location is illustrated for the sake of clarity. For the completely contact-free suspension of a rotating shaft, however, at least two bearing points arranged to be displaced in the axial direction with a total of four magnetic bearings 6 are required, two each acting in the X and Y directions. The speed of rotation of the rotor is measured by an angle or speed of rotation sensor 9f and supplied to the stopping control apparatus 8 via an electrical line 9g.

A voltage converter 4 connected to the intermediate circuit 2a supplies the stopping control apparatus 8 with electrical energy via an electric line 4a. The voltage converter 4 is executed as a clocked wide-range-input-DC/DC converter and is capable of producing an approximately constant voltage from the voltage present at the intermediate circuit 2a, which fluctuates over a wide range depending on the operating state, and thus of supplying the stopping control apparatus 8. It is particularly important that the stopping control apparatus 8 can also still be reliably operated at a very low intermediate circuit voltage. The voltage present at the intermediate circuit 2a is measured by a voltage sensor 9b and supplied via an electrical signal line 9d to the monitoring apparatus 9, which supplies the voltage values determined to the stopping control apparatus 8 via the signal line 9e. As soon as the stopping control apparatus 8 detects a power failure or a mains voltage which is too low, the drive control apparatus 2b and the magnetic bearing driver 3 are actuated by the stopping control apparatus 8 via control lines 8a, 8b, 8c until the rotating shaft has been brought to a standstill and into a defined rest position. The stopping control apparatus 8 can transmit a fault signal to a higher level monitoring apparatus via a signal line 8d.

The drive control apparatus 2b is preferably executed as a vector control apparatus 2b, which operates in accordance with the method of field oriented control or regulation, because it is possible in this manner to produce a higher intermediate circuit voltage from the lower motor voltage of the drive apparatus 7 during the reverse operation of the drive converter 2 and to maintain this intermediate circuit voltage until the speed of rotation of the rotating shaft is zero or at least approximately zero.

Figure 2:
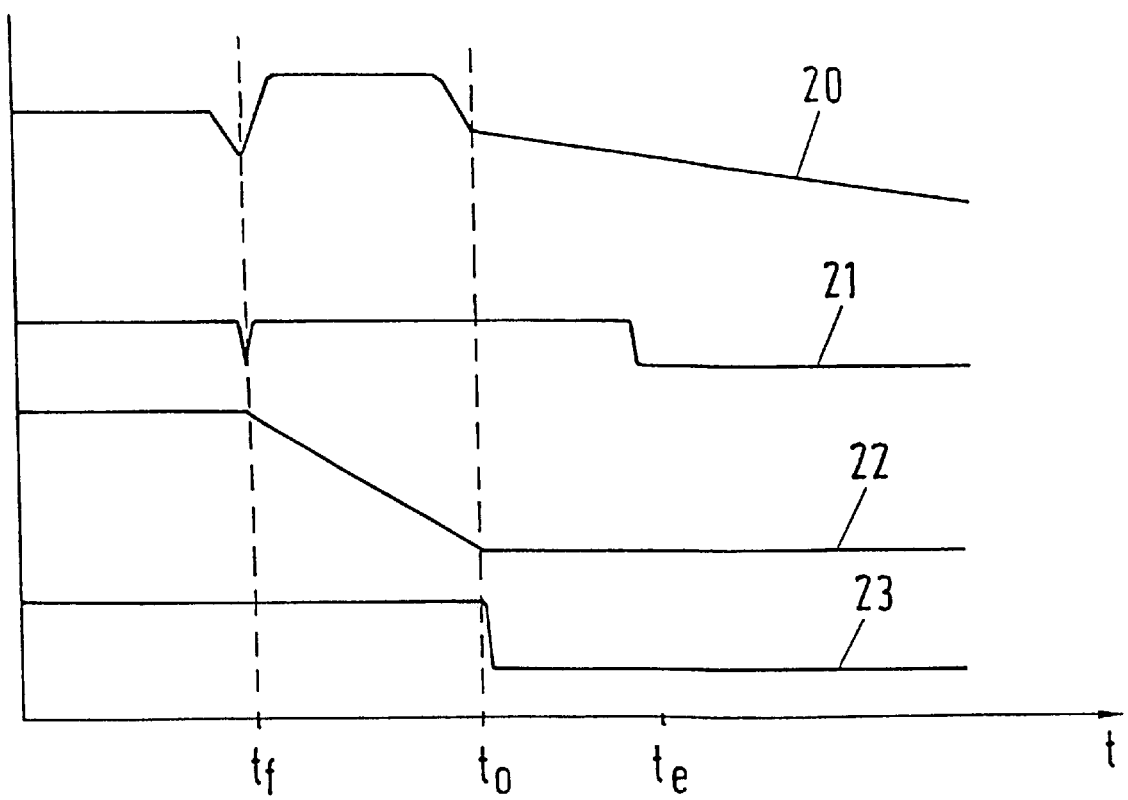
FIG. 2 illustrates the temporal behavior of relevant parameters during a stopping procedure.

The diagram of FIG. 2 shows important system parameters as functions of time for an exemplary arresting method. Curve 20 shows the voltage plot of the intermediate circuit 2a as a function of time. As a result of a power failure the intermediate circuit voltage collapses, which is monitored by the sensor 9b and reported to the stopping control apparatus 8. At the time point $t_f$ the intermediate circuit voltage drops below a predeterminable voltage value, whereupon the stopping control apparatus 8 is activated in order to bring the drive apparatus 7 to a standstill. The curve 22 describes the speed of rotation of the drive apparatus 7 as a function of time, with the speed of rotation dropping to the value zero between the time point $t_f$ and the time point $t_o$ so that the drive apparatus 7 has come to a standstill at the time point $t_o$. During the time interval between $t_f$ and $t_o$ the drive converter 2 is operated by the stopping control apparatus 8 as a controlled rectifier in such a manner that the lower motor voltage of the asynchronous machine 7 is transformed to a higher intermediate circuit voltage, so that this intermediate circuit voltage, as can be seen from the behaviour of the curve 20, partially has a higher voltage value during the time interval under consideration than the intermediate circuit voltage prior to the time point $t_f$. In this respect, the asynchronous machine 7 is operated by the vector control apparatus 2b with a vector control method in order to withdraw kinetic energy from the asynchronous machine 7 in a controlled manner, to brake the latter in a controlled manner, and to convert the withdrawn energy into electrical energy. In the illustrated exemplary procedure of an arresting process, the voltage of the intermediate circuit 2a is held at a value as constant as possible during the entire time interval between $t_f$ and $t_o$. In this arrangement, the stopping control apparatus 8 and the magnetic bearing drivers 3 are supplied with electric energy via the intermediate circuit 2a. The magnetic bearing drivers 3 are actuated by the stopping control apparatus 8 via the control lines 8b, 8c in such a manner that, as shown in the plot 23, the position of the rotating shaft is maintained, at least with respect to the Y direction, up to the expiration of the time point $t_o$. Thereafter the position of the stationary shaft is lowered until the shaft lies on a bearing part in a position of rest. The intermediate circuit 2a has an approximately nominal voltage at the time point $t_o$ so that the energy stores, such as condensers, which are located in the intermediate circuit 2a, in the drive converter 2, in the magnetic bearing driver 3 or in the voltage converter 4, are still nearly completely charged at the time point $t_o$. This stored energy is used in the time interval following the time point $t_o$ in order to continue providing the stopping control apparatus 8 as well as the magnetic bearing drivers 3 with energy in order to bring the shaft into a rest position after the standstill. After the arresting process is completed in such a manner, a fault signal is reported to a higher level monitoring apparatus via the signal line 8d at the time point $t_e$, as seen in the curve 21 illustrating a fault signal. After the time point $t_o$ the intermediate circuit voltage drops increasingly in accordance with the path of the curve 20.

The exemplary embodiment of an arresting method illustrated in FIG. 2 has the following steps:

1. Detection of an insufficient mains voltage or of a power failure.

2. Regenerative braking of the drive machine 7 with the generation of electric energy until the speed of rotation of the rotor amounts to zero or nearly zero.

3. Lowering of the rotor by the magnetic bearings 6

4. Transmission of a fault signal to a higher level control system.

The voltage in the intermediate circuit 2a can be regulated during the regeneratively acting operation mode by the vector control method in such a manner that this voltage is control technically optimized in the time interval between $t_f$ and $t_o$ in order to store the largest possible energy component in the respective energy stores so that sufficient energy is available after the time point $t_o$ to operate the stopping control apparatus 8 and the magnetic bearing drivers 3.

Thanks to the vector control used, a high voltage can be produced at the intermediate circuit 2a over a large range of speeds of rotation of the rotor.

It can prove advantageous to arrange an additional voltage converter 5 between the magnetic bearing driver 3 and the magnetic bearings 6, as illustrated in FIG. 1, in order to provide the magnetic bearings 6 with a sufficiently high voltage.

In FIG. 2 only one stopping method out of numerous possible types of time behavior is illustrated. Thus, for example, the lowering of the rotor shaft can already be initiated when the speed of rotation drops below a predeterminable desired value, and has, for example, a value of 1% of the nominal speed of rotation. In this arrangement, after the magnetic bearings 3 have been switched off, the rotor shaft would come into contact with the fixed bearing at a low speed of rotation and run down to a standstill. With very heavy rotor shafts in particular the possibility exists that the energy stored in the intermediate circuit is not sufficient to completely bring the rotor to a standstill prior to its being lowered, so that the fixed emergency operation bearing is designed in such a manner that the rotor can run down to a standstill without or with only very slight damage to the bearing.

FIG. 3 shows an operating method for bridging merely a very brief mains fault. The curve 20 again shows the voltage plot of the intermediate circuit 2a as a function of time. As a result of a lowering of the mains voltage, the intermediate circuit voltage collapses, which is monitored by the sensor 9b. At the time point $t_f$ the intermediate circuit voltage drops below a predeterminable voltage value, whereupon the stopping control apparatus 8 is activated. The drive converter 2 is switched over to a regeneratively acting mode of operation in order to raise the intermediate circuit voltage and thus to ensure the electrical supply of the drivers 3 feeding the magnetic bearings 6 and the stopping control apparatus 8. At the time point $t_g$ the voltage sensor determines that the mains fault is ended. Thereupon the drive converter 2 is switched by the stopping control apparatus 8 into an operating mode which act s drivingly on the drive apparatus 7, with the intermediate circuit voltage dropping to a normal value as shown in curve 20 and with the speed of rotation of the rotating part rising again to the nominal speed of rotation as shown in curve 22. Curve 23, which shows the position of the rotating part in the Y direction, never experiences a change, which means that the position of the rotating part experiences no change in spite of the occurrence of a mains disturbance. The time points $t_o$ and $t_e$ are shown in order to clarify the difference from the plot of FIG. 2. These time points, however, are meaningless for the method in accordance with FIG. 3. In accordance with the behavior of curve 21 no fault signal is transmitted to a higher level apparatus.

The exemplary embodiment of an operating method illustrated in FIG. 3 has the following steps:

1. Detection of a mains disturbance.

2. Regenerative braking of the drive machine 7 with the generation of electric energy.

3. Detection of the end of the mains disturbance

4. Control of the speed of rotation and the position of the rotor.

5. If the system stability permits:

Driving the drive machine 7 with energy drawn from the mains and acceleration of the rotor to a nominal speed of rotation otherwise:

further regenerative braking of the drive machine 7 until the speed of rotation of the rotor amounts to zero or nearly zero and then lowering the rotor into a rest position by the magnetic bearings 6.

It will be understood that the invention is not restricted to the asynchronous machine mentioned in the exemplary embodiment. The drive apparatus 7 of the arrangement in accordance with the invention and/or the drive apparatus 7 operated with the method in accordance with the invention can naturally also be a different type of electrical machine, in particular a synchronous machine or a brushless direct current (DC) machine or a reluctance machine. The preceding explanations with reference to the exemplary embodiment also hold in an analogous manner for brushless direct current (DC) machines, reluctance machines, synchronous machines and electrical machines in general. The use of the preferred field oriented control for the control of synchronous machines is treated for example in the book "Digitale Regelung elektrischer Antriebe" already cited above.

We claim:

1. A method for operating a magnetically suspended, electromotoric drive apparatus in the event of a mains disturbance, the method comprising the steps of:

detecting a power supply disturbance;

thereupon operating a drive converter feeding the drive apparatus in a regeneratively acting mode of operation for the electrical generation of energy using a field oriented control method; and supplying the generated electrical energy to a driver feeding a magnetic bearing and to a stopping control apparatus.

2. The method of claim 1 further comprising the step of bringing the drive apparatus into a rest position in a controlled manner by the stopping control apparatus.

3. The method of claim 1 wherein insofar as the rotatable part of the drive apparatus is still magnetically suspended at the end of the detected disturbance, the drive converter is switched over to a drivingly acting mode of operation by the stopping control apparatus in order that the drive apparatus is again brought to a nominal speed of rotation.

4. The method of claim 1 wherein the step of operating the drive converter feeding the drive apparatus in a regeneratively acting mode of operation comprises regeneratively braking the drive apparatus using the field oriented control method.

5. The method of claim 4 further comprising the step of maximizing a voltage transmitted to an intermediate circuit which is connected to the drive apparatus, the driver, and the drive converter during the regenerative braking of the drive apparatus.

6. The method of claim 5 wherein the voltage is raised above a value present at the intermediate circuit during a normal operation.

7. The method of claim 5 further comprising the step of, when the speed of rotation of the drive apparatus drops below a predetermined value or the drive apparatus comes to a standstill, deactivating the magnetic bearing in a controlled manner with the help of stored residual energy available in the intermediate circuit and bringing the rotating parts of the drive apparatus to a rest position.

8. The method of claim 4 further comprising the step of charging an energy storage arranged in at least one of the drive converter, the driver, and the drive converter to as high a value as possible during the regenerative braking of the drive apparatus.

9. A method for operating a magnetically suspended, electromotoric drive apparatus in the event of a mains disturbance, the method comprising the steps of:

detecting a power supply disturbance;

thereupon operating a drive converter feeding the drive apparatus in a regeneratively acting mode of operation for the electrical generation of energy;

supplying the generated electrical energy to a driver feeding a magnetic bearing and to a stopping control apparatus; and producing and transmitting a fault signal to a higher level monitoring apparatus with the help of stored residual energy available in an intermediate circuit.

10. An arrangement for operating a magnetically suspended, electromotoric drive apparatus in the event of a mains disturbance, the arrangement comprising:

a stopping control apparatus;

a drive converter feeding the drive apparatus;

a driver feeding a magnetic bearing;

a voltage converter feeding the stopping control apparatus;

a common intermediate circuit connected to the drive converter, the driver, and the voltage converter; and a vector control apparatus for field oriented control of the drive apparatus and of the drive converter;

wherein the drive converter is switchable to a regeneratively acting mode of operation by the stopping control apparatus in the event of a mains disturbance in order to provide at least the driver feeding the magnetic bearing and the stopping control apparatus with electrical energy via the intermediate circuit.

11. The arrangement of claim 10 wherein at least one of the driver converter, the driver, and the voltage converter comprises a condenser for the storing of energy.

12. The arrangement of claim 10 wherein the drive apparatus comprises an electric machine.

13. The arrangement of claim 12 wherein the electric machine is selected from the group consisting of an induction machine, a synchronous machine, a reluctance machine, and a brushless DC machine.

* * * * *